(12) United States Patent
Takahashi

(10) Patent No.: US 12,105,344 B2
(45) Date of Patent: Oct. 1, 2024

(54) LENS BARREL AND IMAGE PROJECTION APPARATUS

(71) Applicant: RICOH INDUSTRIAL SOLUTIONS INC., Yokohama (JP)

(72) Inventor: Kazuhisa Takahashi, Yokohama (JP)

(73) Assignee: RICOH INDUSTRIAL SOLUTIONS INC., Yokohama (JP)

( * ) Notice: Subject to any disclaimer, the term of this patent is extended or adjusted under 35 U.S.C. 154(b) by 401 days.

(21) Appl. No.: 17/437,491

(22) PCT Filed: Apr. 9, 2020

(86) PCT No.: PCT/JP2020/016006
§ 371 (c)(1),
(2) Date: Sep. 9, 2021

(87) PCT Pub. No.: WO2020/209343
PCT Pub. Date: Oct. 15, 2020

(65) Prior Publication Data
US 2022/0057595 A1     Feb. 24, 2022

(30) Foreign Application Priority Data

Apr. 12, 2019   (JP) .................................. 2019-076497

(51) Int. Cl.
*G02B 7/02*     (2021.01)
*G02B 7/10*     (2021.01)
(Continued)

(52) U.S. Cl.
CPC ............... *G02B 7/023* (2013.01); *G02B 7/10* (2013.01); *G02B 13/16* (2013.01); *G02B 13/18* (2013.01); *G02B 17/06* (2013.01)

(58) Field of Classification Search
CPC .......... G02B 7/023; G02B 7/10; G02B 13/16; G02B 13/18; G02B 17/06; G02B 17/08; G03B 21/28
See application file for complete search history.

(56) References Cited

U.S. PATENT DOCUMENTS

2007/0297070 A1* 12/2007 Shimizu ............... G03B 21/142
                                                         359/701
2016/0216598 A1*  7/2016 Takehana ............. G03B 21/142
(Continued)

FOREIGN PATENT DOCUMENTS

JP              61-18909 A       1/1986
JP            S 61-018909 A      1/1986
(Continued)

OTHER PUBLICATIONS

International Search Report issued Jul. 14, 2020 in PCT/JP2020/016006 filed Apr. 9, 2020, 2 pages.
(Continued)

*Primary Examiner* — Magda Cruz
(74) *Attorney, Agent, or Firm* — XSENSUS LLP

(57) ABSTRACT

A lens barrel including a space-saving position adjustment function. The lens barrel constitutes a part of a projection optical system including a catoptric system including at least one reflecting mirror and that uses a dioptric system including multiple lens groups. At least one of the multiple lens groups includes a non-circular lens. The lens barrel includes a movable part that has an inner wall surface holding the non-circular lens and that is able to move the lens group that includes the non-circular lens in an optical axis direction of the non-circular lens, a holding part that is disposed on an outer circumferential side of the movable part and that holds the movable part and a shaft part formed in the optical axis
(Continued)

direction, and a curved part that is disposed on an outer circumferential side of the holding part.

14 Claims, 11 Drawing Sheets

(51) Int. Cl.
  *G02B 13/16* (2006.01)
  *G02B 13/18* (2006.01)
  *G02B 17/06* (2006.01)

(56) References Cited

U.S. PATENT DOCUMENTS

| | | | |
|---|---|---|---|
| 2019/0137853 A1* | 5/2019 | Takehana | G02B 7/04 |
| 2021/0263301 A1* | 8/2021 | Oshima | G03B 21/147 |
| 2021/0278571 A1* | 9/2021 | Shimizu | G02B 7/102 |

FOREIGN PATENT DOCUMENTS

| | | | | |
|---|---|---|---|---|
| JP | 2006-10885 A | 1/2006 | | |
| JP | 2006-010885 A | 1/2006 | | |
| JP | 2010039403 A | * 2/2010 | | G02B 7/04 |
| JP | 5312891 B2 | 10/2013 | | |
| JP | 5571512 B2 | 8/2014 | | |
| JP | 2016-139114 A | 8/2016 | | |
| JP | 6435543 B2 | 12/2018 | | |
| KR | 2018-0026181 A | * 3/2018 | | G02B 7/02 |

OTHER PUBLICATIONS

Japanese Office Action issued Aug. 15, 2023 in corresponding Japanese Patent Application No. 2021-513705 (English translation only), 5 pages.

* cited by examiner

LENS BARREL AND IMAGE PROJECTION APPARATUS

TECHNICAL FIELD

The present invention relates to a lens barrel and an image projection apparatus.

BACKGROUND ART

When a lens unit is to be attached to a housing in an image projection apparatus, represented by a projector, position adjustment between lenses and position adjustment with a light source are performed to adjust optical performance.

With an increase in the diameters of lenses, a spatial margin for attaching such a position adjustment function for lenses tends to decrease.

Thus, there are a configuration (for example, refer to PTL 1, PTL 2, and the like) for achieving space saving by decentering a cam rotation center axis from an optical axis and a configuration (for example, refer to PTL 3 and the like) for moving a large-diameter lens on an enlargement side by a cam or the like attached on a reduction side at which there are a large number of lenses having comparatively small diameters. However, these configurations have a problem that, for example, a lens layout on the reduction side is limited.

SUMMARY OF INVENTION

Technical Problem

The present invention has been made on the basis of the above problem, and an object of the present invention is to provide a novel lens barrel including a space-saving position adjustment function.

Solution to Problem

A lens barrel according to the present invention is a lens barrel that constitutes a part of a projection optical system including a catoptric system including at least one reflecting mirror and that uses a dioptric system including multiple lens groups. At least one of the multiple lens groups includes a non-circular lens. The lens barrel includes a movable part that has an inner wall surface holding the non-circular lens and that is able to move the lens group that includes the non-circular lens in an optical axis direction of the non-circular lens, a holding part that is disposed on an outer circumferential side of the movable part and that holds the movable part and a shaft part formed in the optical axis direction, and a curved part that is disposed on an outer circumferential side of the holding part and that includes, in a lateral surface having a curvature, multiple grooves inclined to each other. A first fixation member fixed to the holding part is engaged with one of the multiple grooves, and a second fixation member fixed to the movable part is engaged with another one of the multiple grooves.

Advantageous Effects of Invention

A lens barrel according to the present invention can provide a space-saving and high-performance position adjustment function.

DESCRIPTION OF EMBODIMENTS

Figure 1:
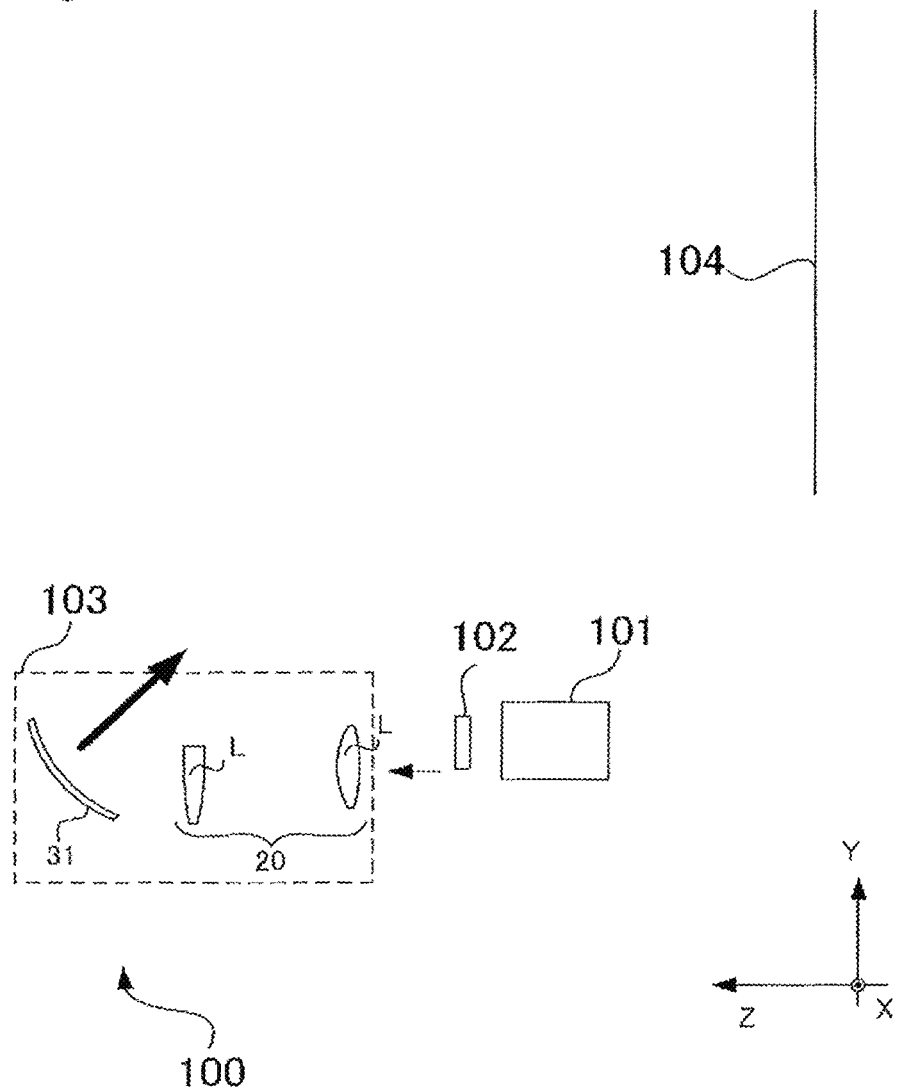
FIG. 1 is a view illustrating an example of an image projection apparatus as an embodiment of the present invention.

As the first embodiment of the present invention, an image projection apparatus 100 including a lens unit 103 is illustrated in FIG. 1.

In the following description, an optical axis direction of a lens held by the lens unit 103 as a lens barrel is referred to as a Z direction. In a direction perpendicular to the Z axis, the upward direction in FIG. 1 is referred to as a Y direction. A direction perpendicular to the Z direction and the Y direction is referred to as an X direction. As necessary, the side of a projection surface 104, which is the +Z direction side, in the lens unit 103 is referred to as an enlargement side, and the side of an image display element 102, which is the −Z direction side, is referred to as a reduction side.

As illustrated in FIG. 1, the image projection apparatus 100 according to the present invention includes a light source 101, the image display element 102 that displays an image to be projected and gives image information to a light flux from the light source 101, and a lens unit 103 that includes multiple lenses for forming an image of the light flux transmitted through the image display element 102 on the projection surface 104.

The lens unit 103 includes a lens barrel 20 as a lens holding part that holds a lens group including multiple lenses, and a reflection part 30 including a reflecting mirror 31 that reflects the light flux emitted from the lens barrel 20 and projects the light flux toward the projection surface 104.

That is, in the present embodiment, the lens barrel 20 is a lens barrel that constitutes a part of a projection optical system including the reflection part 30 as a catoptric system including at least one reflecting mirror and that uses a dioptric system including multiple lens groups.

Figure 2:
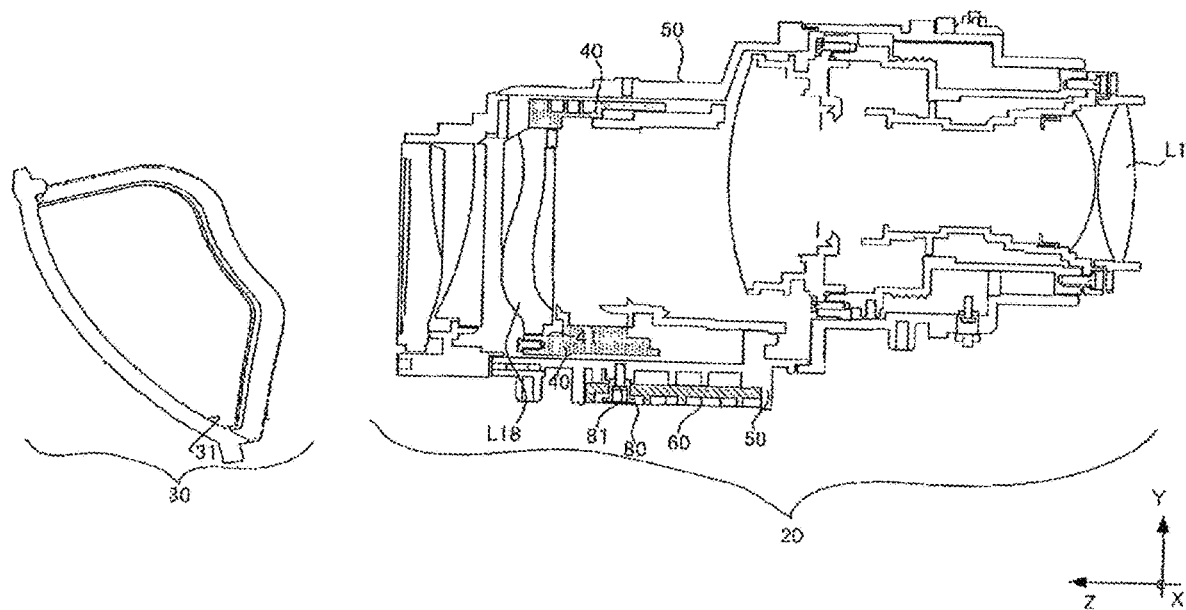
FIG. 2 is a view illustrating an example of a configuration of a lens unit that constitutes the present invention.

As illustrated in FIG. 2, the lens group held by the lens barrel 20 of the present embodiment includes non-circular lenses L16 to L20.

The present embodiment in which, in particular, the lens L18 is moved in the Z-axis direction to perform position adjustment will be described. The present embodiment is, however, not limited to having such a configuration, and any of the non-circular lenses may be moved.

Figure 3:
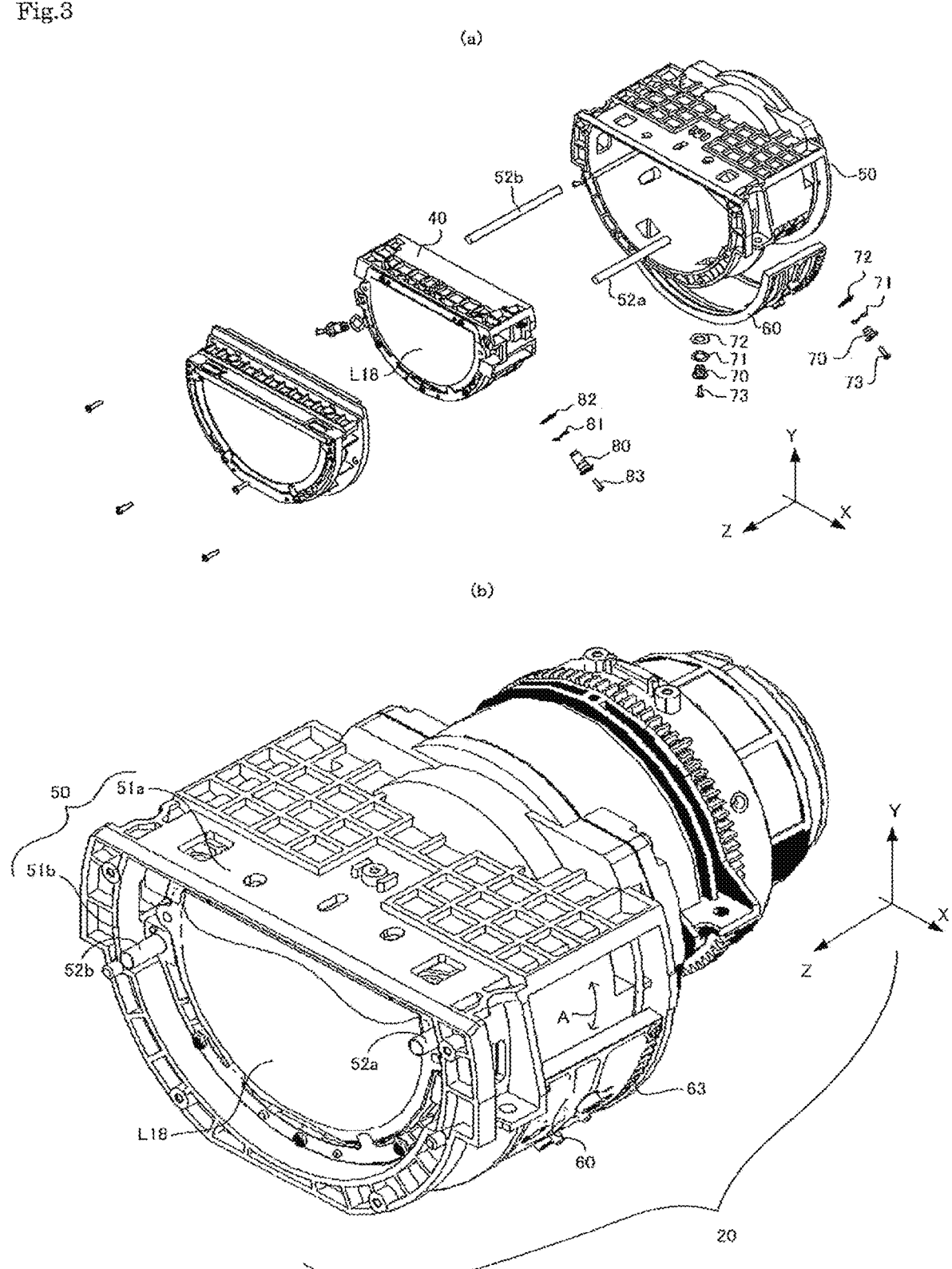
FIG. 3 is a view illustrating an example of a configuration of a lens barrel illustrated in FIG. 2.

As illustrated in FIG. 2 and FIG. 3, the lens barrel 20 includes a movable part 40 having an inner wall surface 41 that holds the non-circular lens L18, a holding part 50 that is disposed on the outer circumferential side of the movable part 40 and that holds the movable part 40, and a curved part 60 that is disposed on the outer circumferential side of the holding part 50.

The lens barrel 20 includes multiple barrels for holding the lenses L1 to L17, L19, and L20. Details of the configuration of the lens barrel 20 are omitted.

Figure 4:
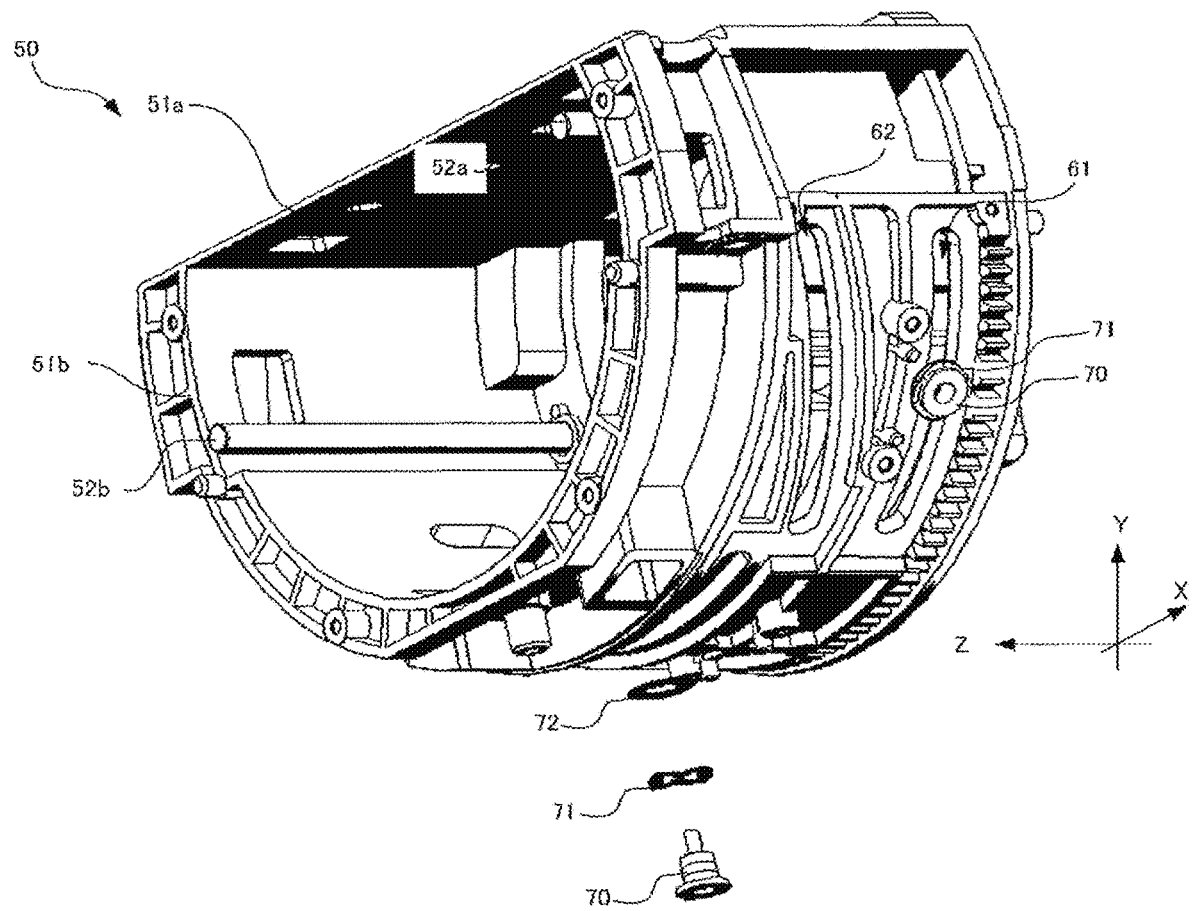
FIG. 4 is a view illustrating an example of configurations of a holding part and a curved part in the lens barrel illustrated in FIG. 3.

As illustrated in FIG. 4, the holding part 50 is a cylindrical member having an outline of a so-called D-cut shape obtained by cutting off a surface on the +Y direction side from a columnar shape. In other words, the holding part 50 is constituted by a flat plate-shaped upper surface 51a parallel to the ZX plane, and a curved surface 51b formed in the circumferential direction of the Z axis and having a curvature.

The holding part 50 includes guide shafts 52a and 52b as shaft parts that inwardly extend parallel to the Z-axis direction. The guide shaft 52a is formed in the vicinity of a position at which the upper surface 51a and the curved surface 51b are in contact with each other. The guide shaft 52b is formed on a side opposite the guide shaft 52a with a lens optical axis interposed therebetween.

The guide shaft 52a and the guide shaft 52b may be disposed to be point-symmetric about the lens optical axis.

The holding part 50 has a movable-part groove 54 that is a gap extending in the Z direction.

A roller 80, which will be described later, is disposed to be inserted into the movable-part groove 54 and is fixed to the movable part 40. A rotation of the curved part 60 in an A direction moves the roller 80 in the Z direction due to a cam groove 62. The movable part 40 thus follows the roller 80 and is also driven in the Z direction.

The curved part 60 is a plate-shaped member disposed on the outer side of the curved surface 51b of the holding part 50. The curved part 60 has a curvature along the curved surface 51b and has a length shorter than the whole circumference of the curved surface 51b. In other words, the curved surface 51b is provided with a margin part to enable the curved part 60 to slide-move on the outer circumferential part.

The curved part 60 has a guide groove 61 parallel to the circumferential direction relative to the Z-axis, and the cam groove 62, which is a groove part formed to be inclined with respect to the guide groove 61.

Figure 5:
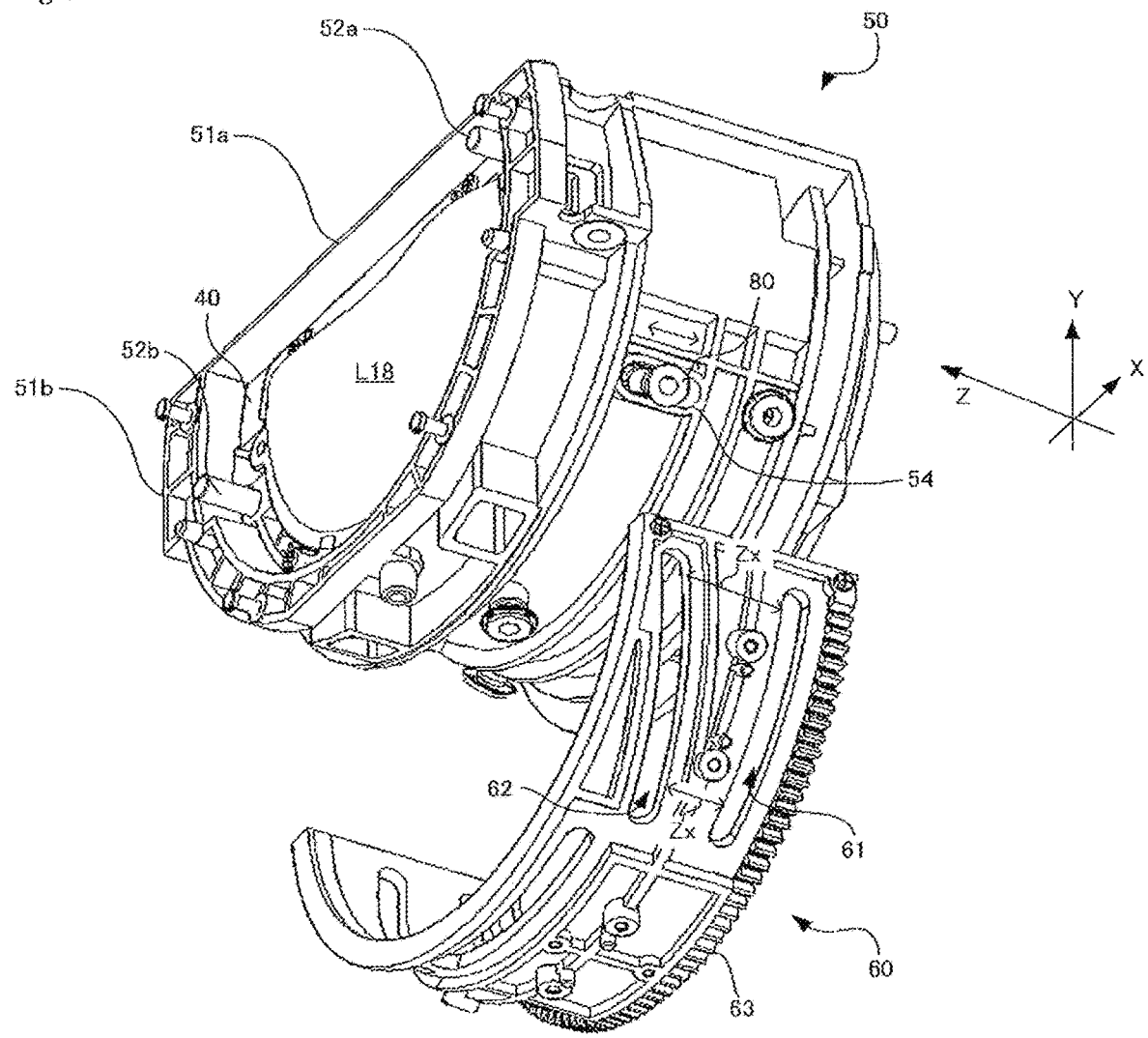
FIG. 5 is a view illustrating an example of the configuration of the curved part illustrated in FIG. 4.

At the guide groove 61, a roller 70, and a wave washer 71, a flat washer 72, and a fixation screw 73 are engaged and disposed as illustrated in FIG. 5.

At the cam groove 62, the roller 80, and a wave washer 81, a flat washer 82, and a fixation screw 83 are engaged and disposed as illustrated in FIG. 5.

As described above, the curved part 60 has the guide groove 61 and the cam groove 62 and is held by fixation members that are engaged and disposed at such multiple grooves, so as to be movable on a lateral surface of the holding part 50 in the A direction, which is the circumferential direction.

The curved part 60 has a gear shape 63 formed at the outer circumferential surface thereof and is driven by a driving member (not illustrated), such as a motor. The gear shape 63 has a function as an operation part that rotates the curved part 60 in the A direction.

Figure 8:
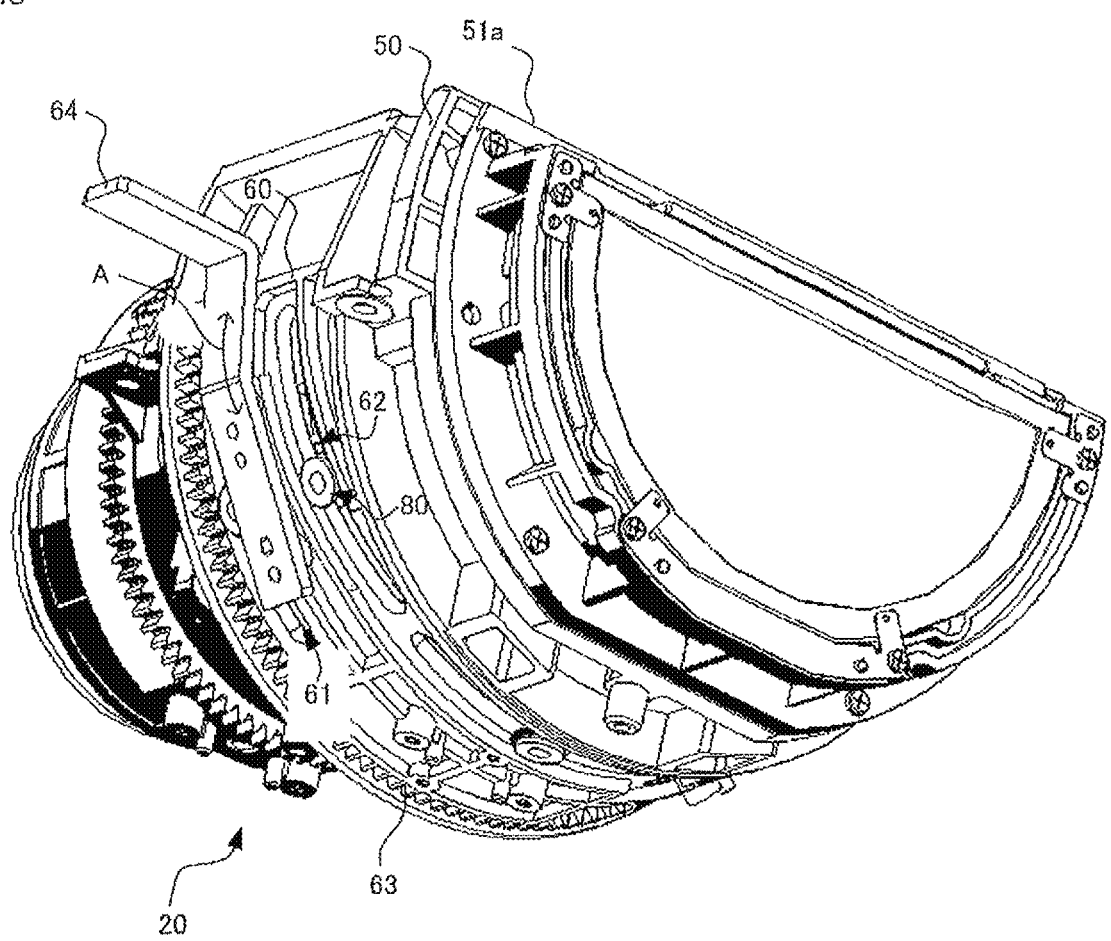
FIG. 8 is a view illustrating an example of a configuration of a grip part.

As a modification of the operation part, a configuration in which a grip part 64 is attached to the outer circumferential surface of the curved part 60, as illustrated in FIG. 8, to drive the curved part 60 may be employed.

As illustrated in FIG. 2, the movable part 40 is a cylindrical member that has the inner wall surface 41 for holding the lens L18 and that has an outline of a so-called D-cut shape along the shape of the lens L18.

Figure 6:
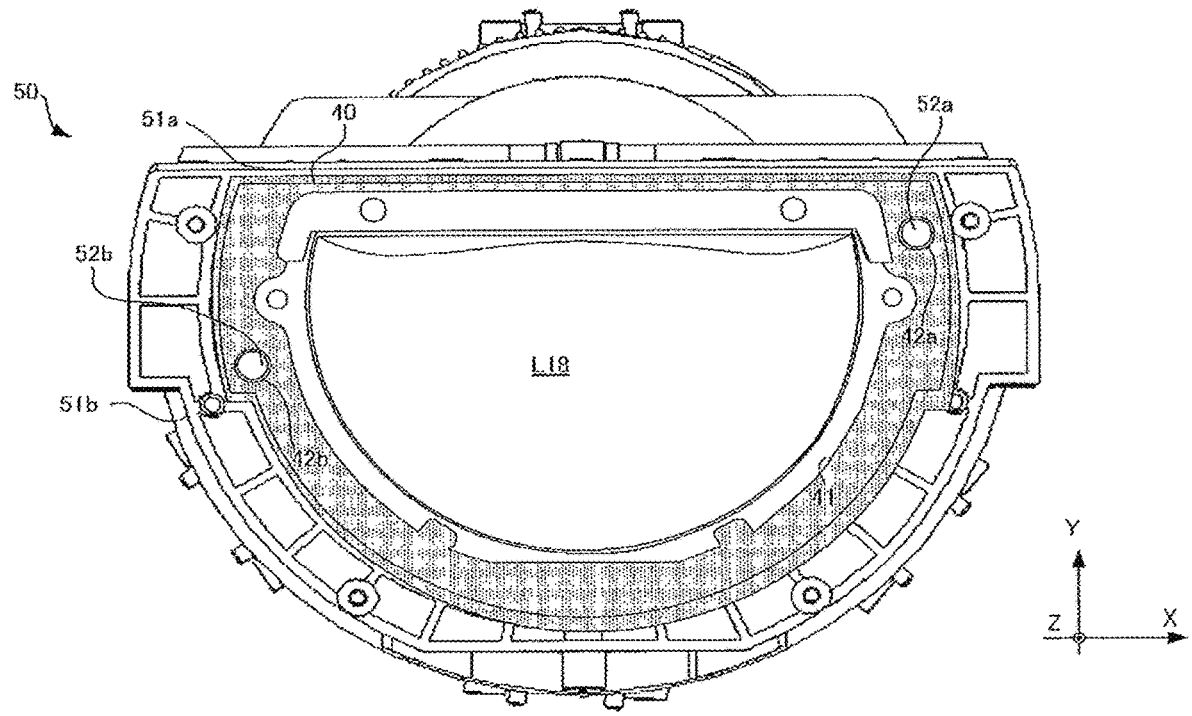
FIG. 6 is a view illustrating an example of a configuration of a movable part.

As illustrated in FIG. 6, the movable part 40 has a size that allows the outer shape of the movable part 40 to be within a region surrounded by the upper surface 51a and the curved surface 51b of the holding part 50. The movable part 40 has guide holes 42a and 42b into which the guide shaft 52a and the guide shaft 52b are inserted, respectively.

The movable part 40 is held by such a configuration to be movable on the inner side of the holding part 50 in forward and rearward directions in the Z direction along the guide shaft 52a and the guide shaft 52b.

Figure 7:
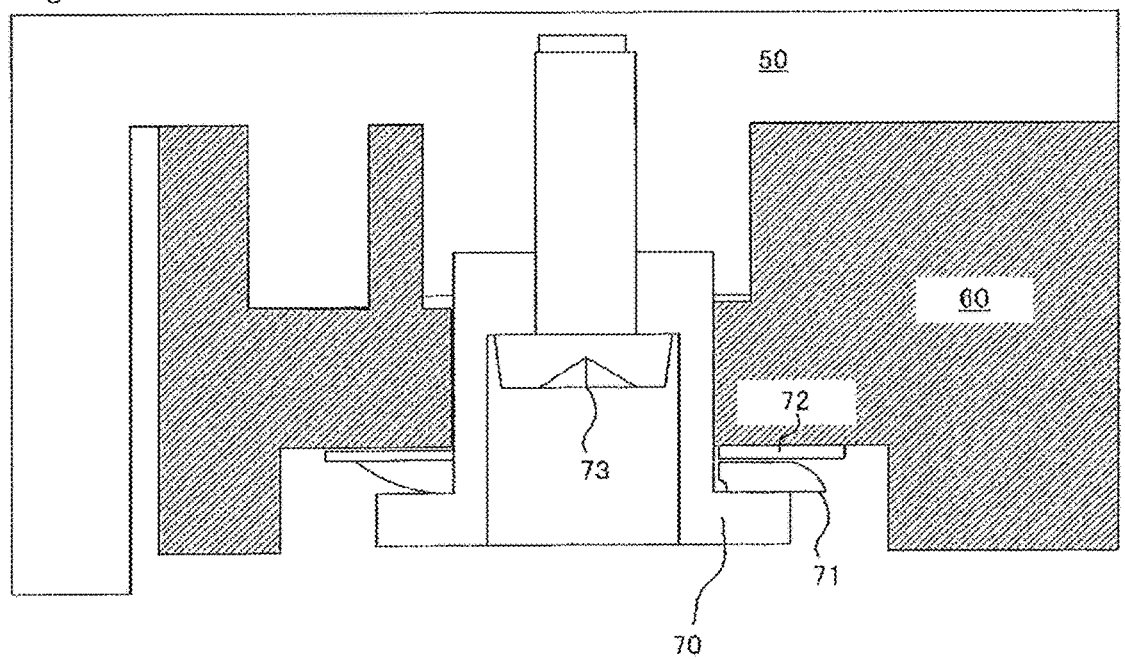
FIG. 7 is a view illustrating an example of a configuration of a first fixation member.

As illustrated in FIG. 7, the roller 70, and the wave washer 71, the flat washer 72, and the fixation screw 73 have a function as a first fixation member as a result of the fixation screw 73 being fixed to the holding part 50, and the roller 70 and the wave washer 71 being engaged with the curved part 60.

Similarly, the roller 80, and the wave washer 81, the flat washer 82, and the fixation screw 83 have a function as a second fixation member as a result of the fixation screw 83 being fixed to the movable part 40, and the roller 80 and the wave washer 81 being engaged with the curved part 60.

The form of fixation of the roller 80, and the wave washer 81, the flat washer 82, and the fixation screw 83 as the second fixation member is similar to that in FIG. 7 only with a change of the holding part 50, which is a fastening destination, to the movable part 40. An illustration of the form is thus omitted.

Since the guide groove 61 and the cam groove 62 are formed to be inclined, an interval $Z_X$ between the guide groove 61 and the cam groove 62 varies in accordance with a movement amount of the curved part 60 in the A direction.

That is, a movement of the curved part 60 in the A direction varies a distance in the Z direction between the roller 70 engaged at the guide groove 61 and the roller 80 engaged at the cam groove 62.

Since the roller 70 is fixed to the holding part 50 and the roller 80 is fixed to the movable part 40, a movement of the curved part 60 in the A direction moves the roller 80 along the cam groove 62 in the Z direction with respect to the roller 70. Therefore, the movable part 40 moves in the Z direction with respect to the holding part 50. The movement direction of the movable part 40 at this time is restricted to only the Z direction along the guide shaft 52a and the guide shaft 52b. As described above, the guide shaft 52a and the guide shaft 52b restrict the movement direction of the movable part 40 to only the Z direction.

Since it is possible, as described above, to move the movable part 40 holding the non-circular lens L18 in the Z direction by moving the curved part 60 in the A direction, the lens barrel 20 can move only the non-circular lens L18 in the Z direction.

A configuration in which one non-circular lens L18 is moved in the present embodiment has been described. It is, however, needless to say that, if multiple cam grooves 62 are formed, it is possible to move multiple lenses at the same time.

Figure 9:
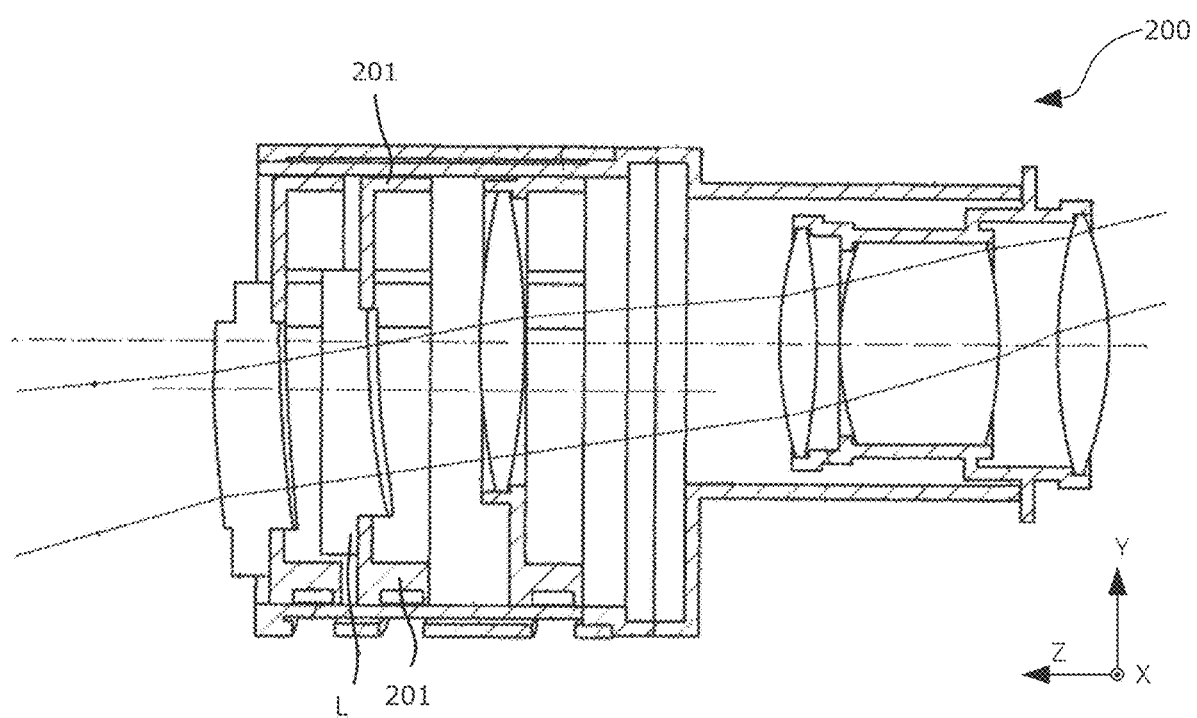
FIG. 9 is a view illustrating an example of a configuration of an image projection apparatus known in the art.

As an example of a lens barrel having a lens-position adjustment function that uses a so-called cam known in the art, a lens barrel 200 is illustrated in FIG. 9.

The lens barrel 200 includes a non-circular lens L and a cylindrical cam structure 201 that is disposed at the periphery of the non-circular lens L and that has a cam groove. The lens barrel 200 has a configuration in which a rotation of the cam structure 201 around the Z axis moves the non-circular lens L forward and rearward in the Z direction.

In the lens barrel 200, it is necessary to drive the non-circular lens L by rotating the cylindrical cam structure 201 to cause the cam structure 201 to function. That is, since the cam structure 201 is also present in a D-cut part that is cut off in the non-circular lens, there is a problem that it is difficult to prevent blockage of a light beam, in particular, in an image projection apparatus with which a catoptric system is used.

Figure 10:
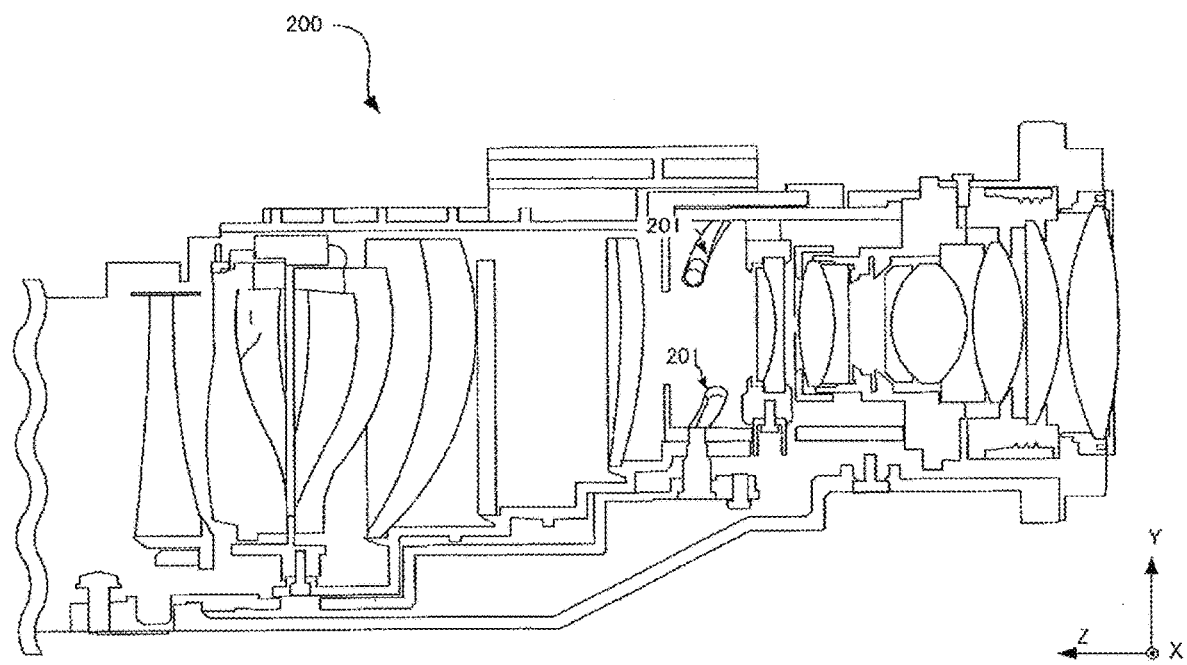
FIG. 10 is a view illustrating an example of a configuration of an image projection apparatus known in the art.

To solve such a problem, for example as illustrated in FIG. 10, a configuration in which the cam structure 201 is disposed at the periphery of a circular lens on the reduction side and in which the non-circular lens L on the enlargement side is driven to be extracted is conceivable. However, there is a problem that the external dimensions are inevitably increased because of convenience for driving a remote position in the forward and rearward directions.

In the present embodiment, to solve such a problem, the curved part 60 is disposed on the outer side of a lens (non-circular lens L18) to be moved, and the non-circular lens L18 is movable forward and rearward in the Z direction by moving the curved part 60 in the A direction. The present embodiment thereby has a more space-saving lens-position adjustment function.

As a result of being able to dispose a moving mechanism on the enlargement side (front group side), it is possible to relax the restriction in the layout on the reduction side (rear group side), compared with a configuration such as that in the example in FIG. 10.

In the present embodiment, at least one of the multiple grooves formed at the curved part 60 is the guide groove 61 extending in the circumferential direction relative to the Z-axis direction, and the other is the cam groove 62 inclined with respect to the guide groove 61.

With such a configuration, the interval $Z_X$ between the guide groove 61 and the cam groove 62 can be freely changed by a rotation of the curved part 60 in the A direction. It is thus possible to perform position adjustment of the non-circular lens L18 by adjusting the positions of the holding part 50 and the movable part 40 in the Z direction.

The first fixation member and the second fixation member are respectively constituted by the rollers 70 and 80 and the wave washers 71 and 81 that are each held between the roller corresponding thereto and the curved part 60.

With such a configuration, the curved part 60 can be rotated with shaking being suppressed by the wave washers 71 and 81.

The present embodiment may include the grip part 64 as an operation part for rotating the curved part 60.

With such configuration, it is possible by moving the curved part 60 in the A direction with use of the grip part 64 to easily perform adjustment of the non-circular lens L18 in the Z direction externally.

In the present embodiment, the image projection apparatus 100 includes the image display element 102 and the lens unit 103, and the non-circular lens L18 is moved forward and rearward in the Z direction by a movement of the curved part 60 in the A direction. With such configuration, the lens unit 103 has a space-saving position adjustment function.

Figure 11:
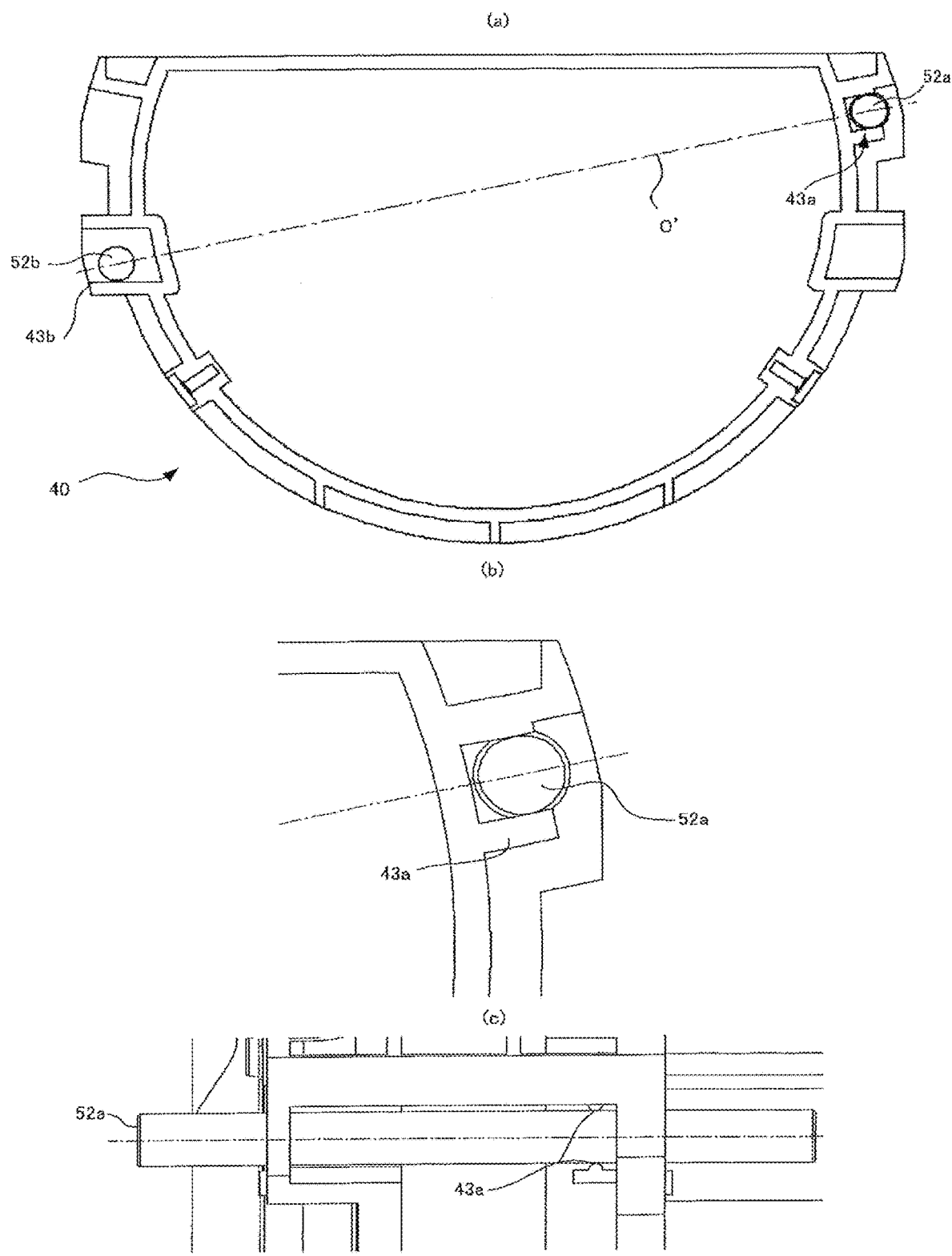
FIG. 11 is a view illustrating an example of a configuration of engagement between a guide shaft and a movable part.

In FIG. 11(a) to (c), as a configuration example of the guide holes 42a and 42b according to the present invention, an explanatory view of a part where the guide shaft 52a as a shaft part is engaged with the movable part 40 is additionally illustrated.

In the present embodiment, the lens barrel 200 includes the guide shaft 52a and the guide shaft 52b each having a function as a shaft part.

The guide shaft 52a and the movable part 40 are engaged with each other at a groove part 43a that is parallel to a straight line O' connecting the centers of the two guide shafts 52a and 52b.

With such a configuration, as illustrated in each of FIGS. 11(b) and (c), it is possible to reduce an area in contact with the guide shafts 52a and 52b, which enables a more smooth movement of the movable part 40.

In the present embodiment, the movable part 40 and the guide shaft 52b are engaged with each other in a round hole on the side of the guide shaft 52b, which is the primary reference side. That is, the movable part 40 has a through hole 43b, in addition to the groove part 43a. With such a configuration, straight movement in the Z direction is mainly restricted on the side of the guide shaft 52b. To increase precision of straight movement, the through hole 43b and the guide shaft 52b are engaged with each other at front and rear two locations in the Z direction.

The guide shaft 52a as the secondary reference side is engaged with the groove part 43a parallel to the straight line O' and thereby acts as rotation restriction of, mainly, the movable part 40. If the secondary reference side also has a through hole, an error (precision of components, thermal expansion, and the like) in a distance between the guide shafts affects an operation. Thus, to cancel such an error, when an engagement part between one of the guide shaft 52a or 52b and the movable part 40 has a round-hole shape, the other one desirably has a groove shape parallel to the straight line O' thus connecting the centers of the two guide shafts 52a and 52b.

As a second embodiment of the present invention, a case in which a lens unit 105 is used instead of the lens unit 103 of a reflective type in the aforementioned embodiment will be described.

Regarding configurations other than the lens unit 103, the same configurations as those in the already-described first embodiment are given the same reference signs, and description thereof is omitted, as appropriate.

Figure 12:
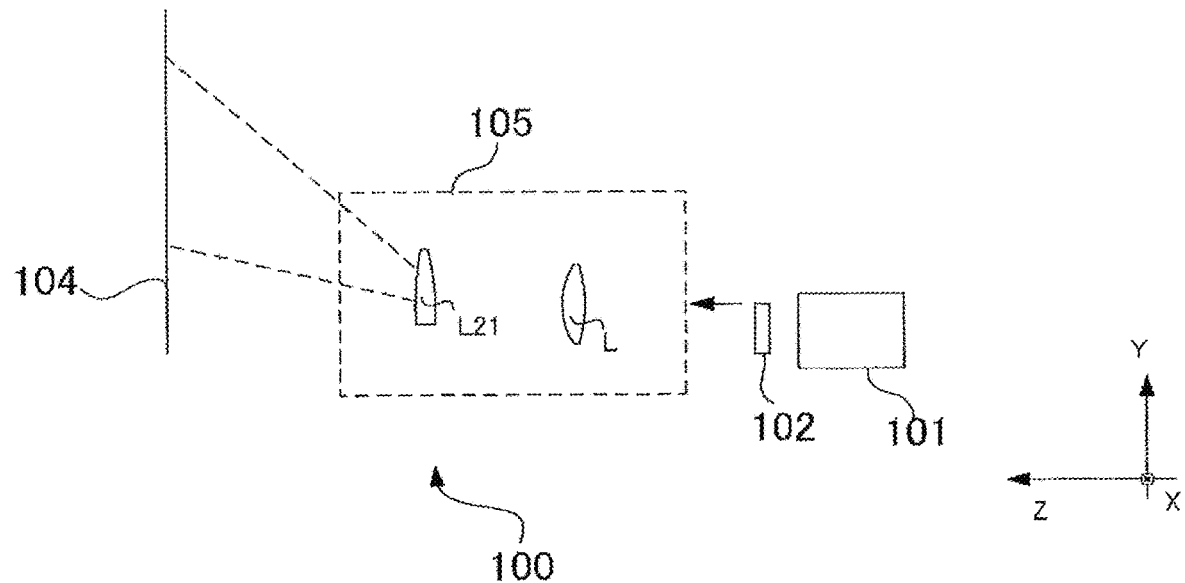
FIG. 12 is a view illustrating an example of an image projection apparatus as a second embodiment of the present invention.

As illustrated in FIG. 12, the image projection apparatus 100 includes a light source 101, the image display element 102 that displays an image to be projected and gives image information to a light flux from the light source 101, and the lens unit 105 that includes multiple lenses for forming an image of the light flux transmitted through the image display element 102 on the projection surface 104.

The lens unit 105 functions as a lens barrel as a lens holding part that holds a lens group including multiple lenses.

That is, in the second embodiment, the lens unit 105 is a lens barrel that uses a dioptric system including multiple lens groups. The lens unit 105 has a function as a projection optical system that projects light toward the projection surface 104.

Figure 13:
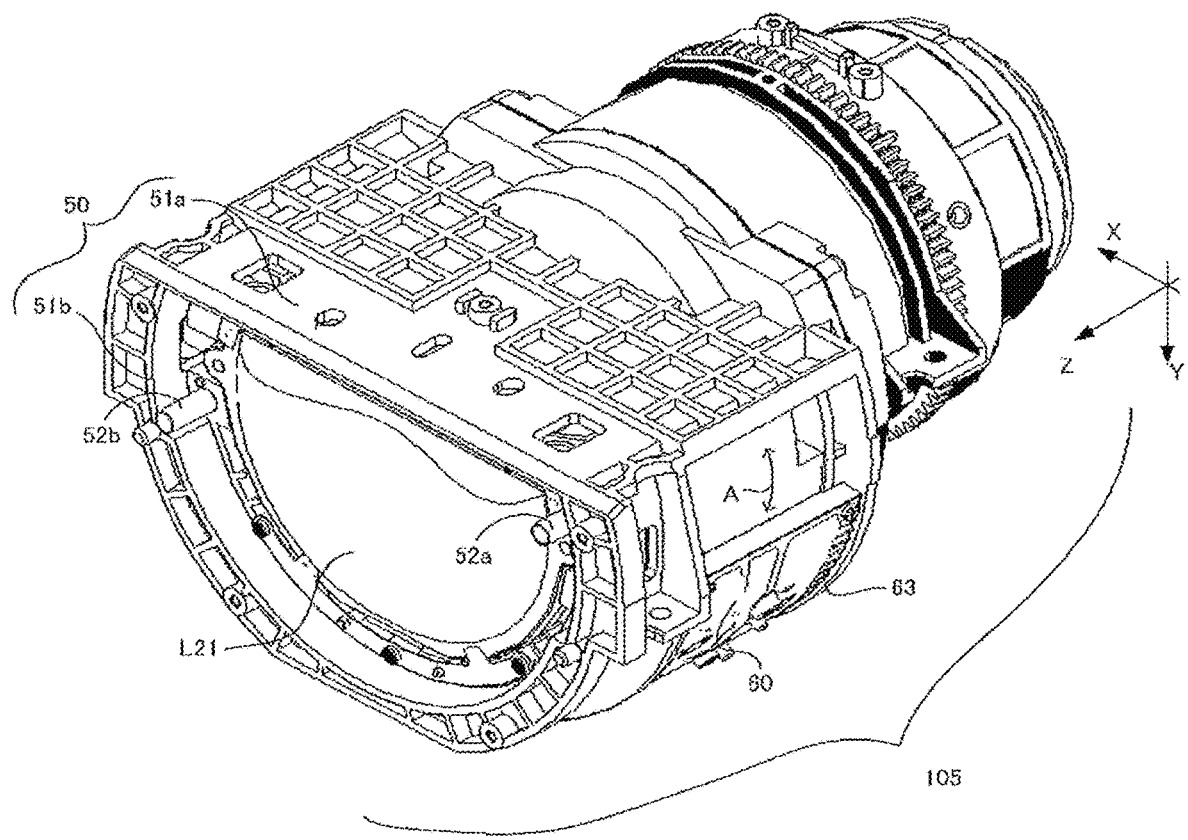
FIG. 13 is a view illustrating an example of a configuration of the lens barrel illustrated in FIG. 12.

As illustrated in FIG. 13, the lens group held by the lens unit 105 of the present embodiment includes a non-circular lens L21 and the like.

The present embodiment in which, in particular, the lens L21 is moved in the Z-axis direction to perform position adjustment will be described. The present embodiment is, however, not limited to having such a configuration, and a non-circular lens disposed at the other position may be moved.

In FIG. 13, the curved surface side of the non-circular lens L21 of the lens unit 105 is illustrated to be directed downward for description. In an actual arrangement, for example, as illustrated in FIG. 12, the curved surface side is disposed to be directed upward when the projection direction of the image projection apparatus 100 is an upward direction.

As illustrated in FIG. 13, the lens unit 105 includes the movable part 40 that has the inner wall surface 41 holding the non-circular lens L21, the holding part 50 that is disposed on the outer circumferential side of the movable part 40 and that holds the movable part 40, and the curved part 60 that is disposed on the outer circumferential side of the holding part 50.

The lens unit 105 may include multiple barrels for holding multiple lenses in addition to the lens L21. Details of the configuration of the lens unit 105 are omitted.

The holding part 50 is a cylindrical member having an outline of a so-called D-cut shape obtained by cutting off a surface on the −Y direction side from a columnar shape. In other words, the holding part 50 is constituted by the flat plate-shaped upper surface 51a parallel to the ZX plane, and the curved surface 51b formed in the circumferential direction of the Z axis and having a curvature.

The holding part 50 includes the guide shafts 52a and 52b as shaft parts that inwardly extend parallel to the Z-axis direction. The guide shaft 52a is formed in the vicinity of a position at which the upper surface 51a and the curved surface 51b are in contact with each other. The guide shaft 52b is formed on a side opposite the guide shaft 52a with a lens optical axis interposed therebetween.

The guide shaft 52a and the guide shaft 52b may be disposed to be point-symmetric about the lens optical axis.

The holding part 50 has the movable-part groove 54 that is a gap extending in the Z direction.

The roller 80, which will be described later, is disposed to be inserted into the movable-part groove 54 and is fixed to the movable part 40. A rotation of the curved part 60 in the A direction moves the roller 80 in the Z direction due to the cam groove 62. The movable part 40 thus follows the roller 80 and is also driven in the Z direction.

The curved part 60 is a plate-shaped member disposed on the outer side of the curved surface 51b of the holding part 50. The curved part 60 has a curvature along the curved surface 51b and has a length shorter than the whole circumference of the curved surface 51b. In other words, the curved surface 51b is provided with a margin part to enable the curved part 60 to slide-move on the outer circumferential part.

The curved part 60 has the guide groove 61 parallel to the circumferential direction relative to the Z-axis, and the cam groove 62, which is a groove part formed to be inclined with respect to the guide groove 61.

At the guide groove 61, the roller 70, and the wave washer 71, the flat washer 72, and the fixation screw 73 are engaged and disposed as illustrated in FIG. 5.

At the cam groove 62, the roller 80, the wave washer 81, the flat washer 82, and the fixation screw 83 are engaged and disposed as illustrated in FIG. 5.

As described above, the curved part 60 has the guide groove 61 and the cam groove 62 and is held by fixation members that are engaged and disposed at such multiple grooves, so as to be movable on a lateral surface of the holding part 50 in the A direction, which is the circumferential direction.

The curved part 60 has the gear shape 63 formed at the outer circumferential surface thereof and is driven by a driving member, such as a motor. The gear shape 63 has a function as an operation part that rotates the curved part 60 in the A direction.

Similarly to that illustrated in FIG. 2, the movable part 40 is a cylindrical member that has the inner wall surface 41 for holding the lens L18 and that has an outline of a so-called D-cut shape along the shape of the lens L18.

Similarly to that illustrated in FIG. 6, the movable part 40 has a size that allows the outer shape of the movable part 40 to be within a region surrounded by the upper surface 51a and the curved surface 51b of the holding part 50. The movable part 40 has the guide holes 42a and 42b into which the guide shaft 52a and the guide shaft 52b are inserted, respectively.

The movable part 40 is held by such a configuration to be movable on the inner side of the holding part 50 in forward and rearward directions in the Z direction along the guide shaft 52a and the guide shaft 52b.

The roller 70, and the wave washer 71, the flat washer 72, and the fixation screw 73 have a function as a first fixation member as a result of the fixation screw 73 being fixed to the holding part 50, and the roller 70 and the wave washer 71 being engaged with the curved part 60.

Similarly, the roller 80, and the wave washer 81, the flat washer 82, and the fixation screw 83 have a function as a second fixation member as a result of the fixation screw 83 being fixed to the movable part 40, and the roller 80 and the wave washer 81 being engaged with the curved part 60.

The form of fixation of the roller 80, and the wave washer 81, the flat washer 82, and the fixation screw 83 as the second fixation member is similar to that in FIG. 7 only with a change of the holding part 50, which is a fastening destination, to the movable part 40. An illustration of the form is thus omitted.

Since the guide groove 61 and the cam groove 62 are formed to be inclined, the interval $Z_X$ between the guide groove 61 and the cam groove 62 varies in accordance with a movement amount of the curved part 60 in the A direction, as illustrated in FIG. 5.

That is, a movement of the curved part 60 in the A direction varies a distance in the Z direction between the roller 70 engaged at the guide groove 61 and the roller 80 engaged at the cam groove 62.

Since the roller 70 is fixed to the holding part 50 and the roller 80 is fixed to the movable part 40, a movement of the curved part 60 in the A direction moves the roller 80 along the cam groove 62 in the Z direction with respect to the roller 70. Therefore, the movable part 40 moves in the Z direction with respect to the holding part 50. The movement direction of the movable part 40 at this time is restricted to only the Z direction along the guide shaft 52a and the guide shaft 52b. As described above, the guide shaft 52a and the guide shaft 52b restrict the movement direction of the movable part 40 to only the Z direction.

Since it is possible, as described above, to move the movable part 40 holding the non-circular lens L21 in the Z direction by moving the curved part 60 in the A direction, the lens unit 105 can move only the non-circular lens L21 in the Z direction.

A configuration in which one non-circular lens L21 is moved in the present embodiment has been described. However, It is needless to say that, if multiple cam grooves 62 are formed, it is possible to move multiple lenses at the same time.

In the present embodiment, the curved part 60 is disposed on the outer side of a lens (non-circular lens L21) to be moved, and the non-circular lens L21 is movable forward and rearward in the Z direction by moving the curved part 60 in the A direction. The present embodiment thereby has a more space-saving lens-position adjustment function.

Movement in the Z direction is thus possible only by an operation on the lower side of the lens unit 105, and it is thereby possible to relax the restriction in the layout of the lens unit 105.

Such a lens-position adjustment mechanism also contributes to a reduction of unintended light, which is so-called ghost light, that intrudes into the inner portion of the lens unit 105.

In the present embodiment, at least one of the multiple grooves formed at the curved part 60 is the guide groove 61 extending in the circumferential direction relative to the Z-axis direction, and the other is the cam groove 62 inclined with respect to the guide groove 61.

With such a configuration, the interval $Z_X$ between the guide groove 61 and the cam groove 62 can be freely changed by a rotation of the curved part 60 in the A direction. It is thus possible to perform position adjustment of the non-circular lens L21 by adjusting the positions of the holding part 50 and the movable part 40 in the Z direction.

The first fixation member and the second fixation member are respectively constituted by the rollers 70 and 80 and the wave washers 71 and 81 that are each held between the roller corresponding thereto and the curved part 60.

With such a configuration, the curved part 60 can be rotated with shaking being suppressed by the wave washers 71 and 81.

In the present embodiment, the image projection apparatus 100 includes the image display element 102 and the lens unit 105, and the non-circular lens L21 is moved forward and rearward in the Z direction by a movement of the curved part 60 in the A direction. With such configuration, the lens unit 105 has a space-saving position adjustment function.

As described above, the lens barrel according the present invention is not limited to a so-called reflective type projection optical system.

Preferable embodiments have been described above in detail. The present invention is, however, not limited thereto. Various changes and replacements can be added to the above-described embodiments without departing from the scope described in the claims.

REFERENCE SIGNS LIST 20 lens barrel
30 catoptric system (reflection part)
31 catoptric system (reflecting mirror)
40 movable part
41 inner wall surface
50 holding part
60 curved part
61 guide groove
62 cam groove
63 gear shape
64 grip part
70 first fixation member (roller)
71 first fixation member (wave washer)
80 second fixation member (roller)
81 second fixation member (wave washer)
100 image projection apparatus
102 image display element
103 lens unit
104 reflecting mirror
105 lens unit
L18 non-circular lens
L21 non-circular lens
Z optical axis direction

CITATION LIST

Patent Literature

PTL 1: Japanese Patent No. 5312891
PTL 2: Japanese Patent No. 5571512
PTL 3: Japanese Patent No. 6435543

The invention claimed is:

1. A lens barrel for use with a projection optical system that includes a catoptric system including at least one reflecting mirror, the lens barrel using a dioptric system that includes multiple lens groups, wherein at least one of the multiple lens groups includes a non-circular lens, wherein the lens barrel comprises;
   a movable part that has an inner wall surface holding the non-circular lens and that is able to move the lens group that includes the non-circular lens in an optical axis direction of the non-circular lens,
   a holding part that is disposed on an outer circumferential side of the movable part and that holds the movable part and a shaft part formed in the optical axis direction, and
   a curved part that is disposed on an outer circumferential side of the holding part and that includes, in a lateral surface having a curvature, multiple grooves inclined to each other, and
   wherein a first fixation member fixed to the holding part is engaged with one of the multiple grooves, and a second fixation member fixed to the movable part is engaged with another one of the multiple grooves,
   wherein the shaft part includes two shaft parts, and
   wherein one of the shaft parts and the movable part are engaged with each other at a groove part that is parallel to a straight line connecting centers of the two shaft parts.

2. The lens barrel according to claim 1,
   wherein at least one of the multiple grooves is a guide groove extending in a circumferential direction relative to the optical axis direction, and another of the multiple grooves is a cam groove inclined with respect to the guide groove.

3. The lens barrel according to claim 1,
   wherein the first fixation member and the second fixation member each include a roller and a wave washer that is held between the roller and the curved part.

4. The lens barrel according to claim 1, comprising:
   an operation part for rotating the curved part.

5. The lens barrel according to claim 4,
   wherein the operation part includes a grip part.

6. The lens barrel according to claim 4,
   wherein the lens barrel has a gear shape formed at the lateral surface of the curved part, and
   wherein the operation part is engaged with the gear shape and rotates the curved part.

7. An image projection apparatus comprising:
   the lens barrel according to claim 1;
   an image display element for displaying an image to be projected; and
   a light source,
   wherein the curved part is rotated to adjust an interval between the multiple lens groups.

8. A lens barrel for use with a projection optical system that projects light on a projection surface, the lens barrel using a dioptric system that includes multiple lens groups, wherein at least one of the multiple lens groups includes a non-circular lens, wherein the lens barrel comprises;
 a movable part that has an inner wall surface holding the non-circular lens and that is able to move the lens group that includes the non-circular lens in an optical axis direction of the non-circular lens,
 a holding part that is disposed on an outer circumferential side of the movable part and that holds the movable part and a shaft part formed in the optical axis direction, and
 a curved part that is disposed on an outer circumferential side of the holding part and that includes, in a lateral surface having a curvature, multiple grooves inclined to each other, and
 wherein a first fixation member fixed to the holding part is engaged with one of the multiple grooves, and a second fixation member fixed to the movable part is engaged with another one of the multiple grooves,
 wherein the shaft part includes two shaft parts, and
 wherein one of the shaft parts and the movable part are engaged with each other at a groove part that is parallel to a straight line connecting centers of the two shaft parts.

9. The lens barrel according to claim 8,
 wherein at least one of the multiple grooves is a guide groove extending in a circumferential direction relative to the optical axis direction, and another of the multiple grooves is a cam groove inclined with respect to the guide groove.

10. The lens barrel according to claim 8,
 wherein the first fixation member and the second fixation member each include a roller and a wave washer that is held between the roller and the curved part.

11. The lens barrel according to claim 8, comprising:
 an operation part for rotating the curved part.

12. The lens barrel according to claim 11,
 wherein the operation part includes a grip part.

13. The lens barrel according to claim 11,
 wherein the lens barrel has a gear shape formed at the lateral surface of the curved part, and
 wherein the operation part is engaged with the gear shape and rotates the curved part.

14. An image projection apparatus comprising:
 the lens barrel according to claim 8;
 an image display element for displaying an image to be projected; and
 a light source,
 wherein the curved part is rotated to adjust an interval between the multiple lens groups.

* * * * *